US012770168B1

(12) United States Patent
Romero, Jr. et al.

(10) Patent No.: US 12,770,168 B1
(45) Date of Patent: Oct. 20, 2026

(54) AUTOMATED TELLER MACHINE FOR OBJECT SCANNING AND APPRAISAL

(71) Applicant: UIPCO, LLC, San Antonio, TX (US)

(72) Inventors: Jose L. Romero, Jr., San Antonio, TX (US); Andre Rene Buentello, San Antonio, TX (US); Nina Schuessler, San Antonio, TX (US); Jennifer Hunt Erickson, San Antonio, TX (US); Breanna Nicole Allerkamp, Boerne, TX (US); Kevin McAdams, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 18/930,082

(22) Filed: Oct. 29, 2024

Related U.S. Application Data

(60) Provisional application No. 63/594,614, filed on Oct. 31, 2023.

(51) Int. Cl.
*G06Q 30/02* (2023.01)
*G06Q 40/08* (2012.01)
*G07F 19/00* (2006.01)

(52) U.S. Cl.
CPC ......... *G06Q 30/0278* (2013.01); *G06Q 40/08* (2013.01); *G07F 19/201* (2013.01)

(58) Field of Classification Search
None
See application file for complete search history.

(56) References Cited

U.S. PATENT DOCUMENTS

| | | | | |
|---|---|---|---|---|
| 9,195,979 | B2 * | 11/2015 | Geller | G06Q 20/34 |
| 9,648,926 | B2 * | 5/2017 | Marks | G06Q 30/0631 |
| 9,959,608 | B1 * | 5/2018 | Freeman | B64C 39/024 |
| 10,832,065 | B1 * | 11/2020 | Lambert | G06V 20/584 |
| 12,039,611 | B2 * | 7/2024 | Spader | G06Q 40/08 |
| 2022/0237764 | A1 * | 7/2022 | Mullet | G06Q 50/16 |

* cited by examiner

*Primary Examiner* — Christopher Bridges
(74) *Attorney, Agent, or Firm* — Potomac Law Group, PLLC; Dannon G. Allbee

(57) ABSTRACT

Aspects of the present disclosure are directed to an automated teller machine (ATM) having personal object scanning and appraisal capabilities, which, in some implementations, can be used for improved valuable personal property (VPP) insurance. The ATM can allow a user to place a personal object in a receptacle having scanning and sensing capabilities provided via, for example, cameras, depth sensors, scales, etc. The ATM can generate a model of the personal object based on the data generated by such scanners and/or sensors, and can apply artificial intelligence models to identify properties of the object. The ATM can further apply a machine learning model trained on known personal objects and past insurance claims to determine a value for the personal object. In some implementations, the ATM can be used in a claims process to compare an original scan of the personal object with a later scan to assess damage.

20 Claims, 10 Drawing Sheets

AUTOMATED TELLER MACHINE FOR OBJECT SCANNING AND APPRAISAL

CROSS-REFERENCE TO RELATED APPLICATIONS

This application claims priority to U.S. Patent Application No. 63/594,614, filed on Oct. 31, 2023, titled "Automated Teller Machine for Object Scanning and Appraisal," which is herein incorporated by reference in its entirety.

TECHNICAL FIELD

The present disclosure is directed to an automated teller machine configured to perform object scanning and appraisal.

BACKGROUND

Conventional automated teller machines (ATMs) are physical electronic banking devices that allow users to complete basic financial transactions without the assistance of a human teller or other bank employee. After inserting a debit, bank, or credit card and a correct personal identification number (PIN), users can perform multiple functions, including checking an account balance, transferring funds, withdrawing funds, and depositing checks and cash. ATMs therefore provide convenience to users who do not wish to enter a bank branch, who are not close to a bank branch, and/or who wish to complete basic financial transactions outside of normal bank branch hours.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Although traditional automated teller machines (ATMs) provide convenience for banking and are generally widely accessible and available, they are limited to only very basic financial transactions. Aspects of the present disclosure are directed to an ATM providing improved functionality, e.g., having personal object scanning and appraisal capabilities. In some implementations, such appraisals can be used for improved valuable personal property (VPP) insurance. The ATM can allow a user to place a personal object in a receptacle having scanning and sensing capabilities provided via, for example, cameras, depth sensors, scales, etc. The ATM can generate a model of the personal object based on the data generated by such scanners and/or sensors and can apply artificial intelligence (AI) models to identify properties of the object. The ATM can further apply a machine learning model trained on known personal objects and past insurance data (e.g., claims, valuations, policy amounts, etc.) to determine a value for the personal object. In some implementations, the ATM can further be used in a claims process to compare an original scan of the personal object with a later scan to assess damage to the personal object and repair or replacement costs.

Figure 1:
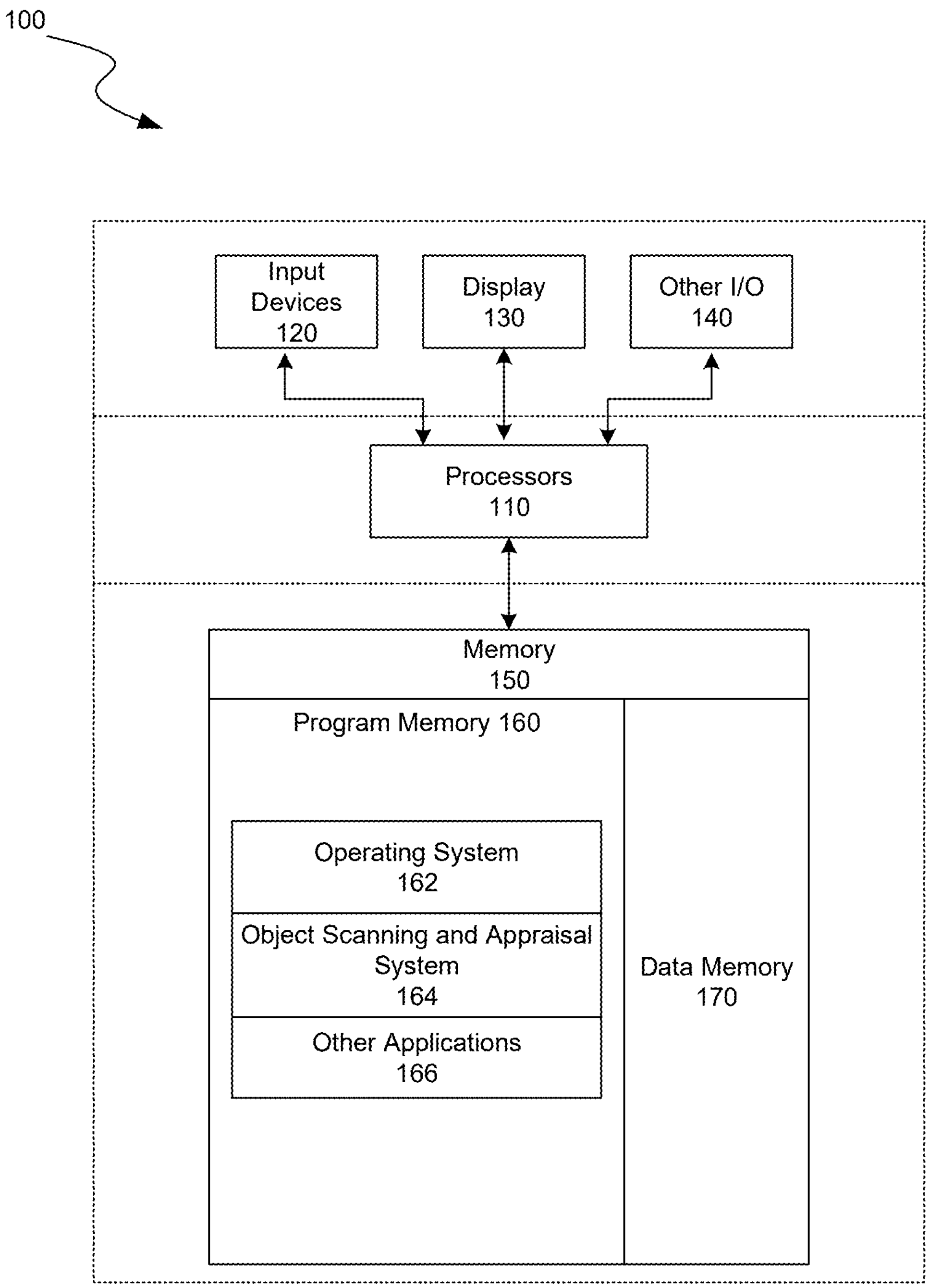
FIG. 1 is a block diagram illustrating an overview of devices on which some implementations can operate.

Several implementations are discussed below in more detail in reference to the figures. FIG. 1 is a block diagram illustrating an overview of devices on which some implementations of the disclosed technology can operate. The devices can comprise hardware components of a device 100 that can perform object scanning and appraisal utilizing an automated teller machine (ATM). Device 100 can include one or more input devices 120 that provide input to the Processor(s) 110 (e.g., CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, object scanning and appraisal system 164, and other application programs 166. Memory 150 can also include data memory 170, e.g., personal object data, scan data, image data, sensor data, characteristic data, model data, training data, configuration data, settings, user options or preferences, etc., which can be provided to the program memory 160 or any element of the device 100.

In various implementations, the technology described herein can include a non-transitory computer-readable storage medium storing instructions, the instructions, when executed by a computing system, cause the computing system to perform steps as shown and described herein. In various implementations, the technology described herein can include a computing system comprising one or more processors and one or more memories storing instructions that, when executed by the one or more processors, cause the computing system to steps as shown and described herein.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
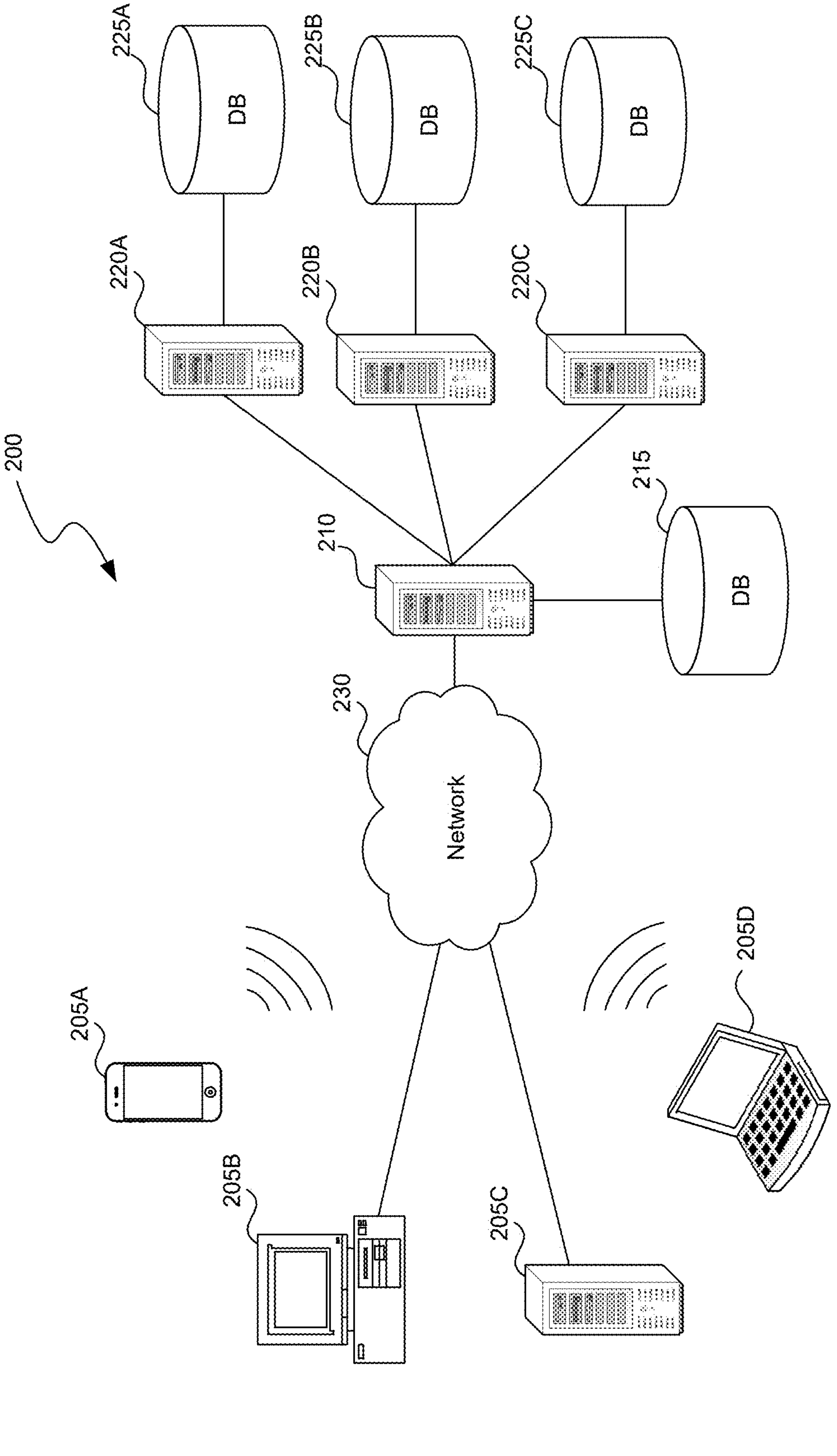
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g., store) information such as personal object data, scan data, image data, sensor data, characteristic data, model data, and/or training data. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
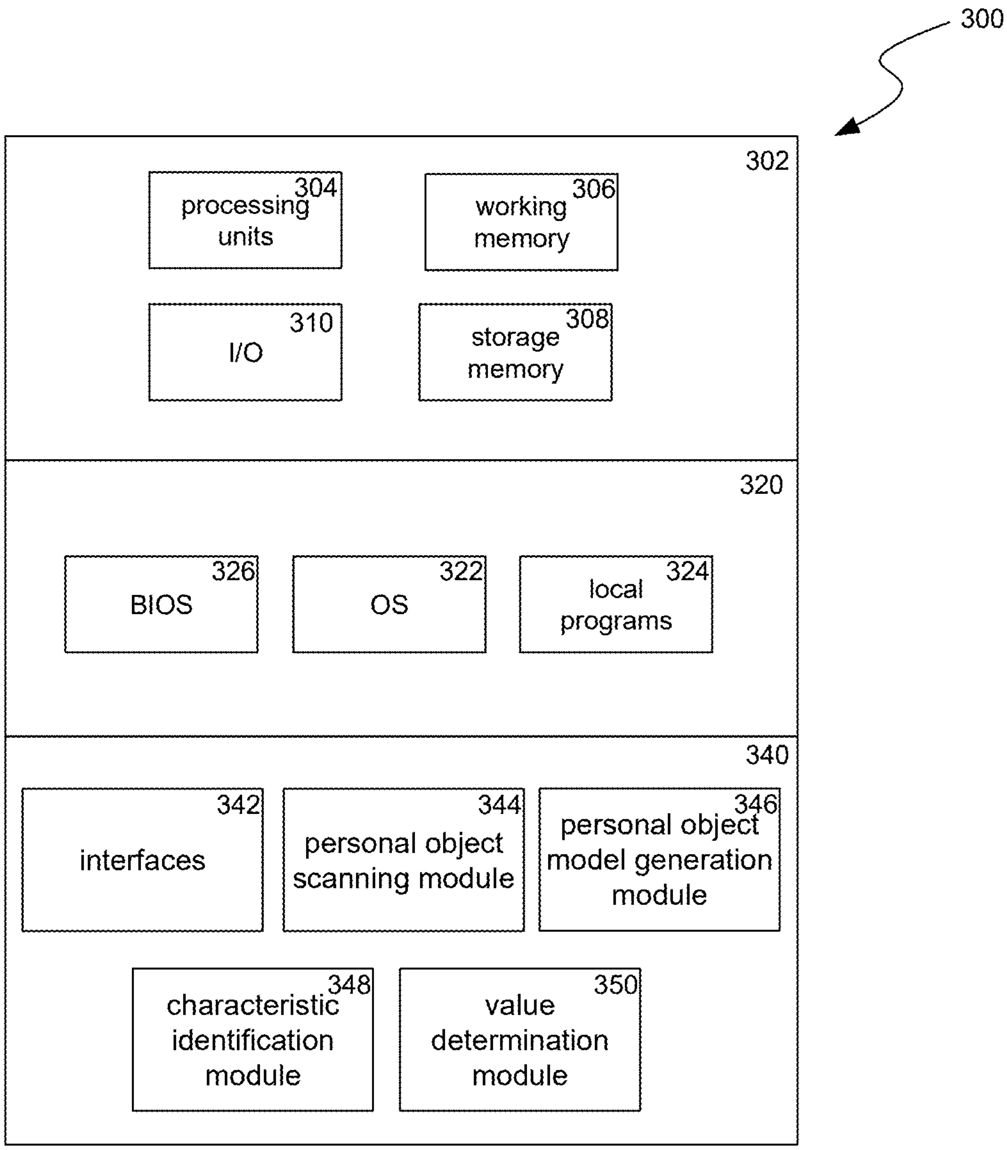
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include personal object scanning module 344, personal object model generation module 346, characteristic identification module 348, value determination module 350, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications. In some implementations, components 300 can execute process 400 of FIG. 4. In some implementations, components 300 can be included in an automated teller machine (ATM), such as ATM 502 of FIG. 5, ATM 800 of FIG. 8, and/or ATM 900 of FIG. 9.

Personal object scanning module 344 can generate an instruction for a scanner (e.g., included in input/output devices 310) to perform a scan of a personal object received by the ATM. For example, a personal object can be placed into an object receptacle (e.g., object receptacle 820 of FIG. 8, object receptacle 916 of FIG. 9, and/or object receptacle 1002 of FIG. 10). The object receptacle can be an open or closable compartment of the ATM that can at least partially encompass the personal object, and that can include the scanner.

In some implementations, personal object scanning module 344 can generate the instruction to scan the personal object automatically based on detection of the personal object in the object receptacle (e.g., based on detected movement within the object receptacle from one or more images or movement detectors, based on detection of weight within the object receptacle, etc.). In some implementations, object scanning module can generate the instruction to scan the personal object based on a manual selection of a button corresponding to scanning of the personal object, such as a physical button on the ATM or a virtual button on a touchscreen display of the ATM. Based on receipt of the instruction, the scanner can scan the personal object to collect data regarding the personal object, such as images of the personal object, depth data for the personal object, etc. In some implementations, the scanner can perform a 360-degree scan of the personal object by capturing images of the object from multiple different angles and/or positions. Further details regarding scanning a personal object are described herein with respect to block 402 of FIG. 4.

Personal object model generation module 346 can generate a model of the personal object based, at least partially, on the scan. For example, when the scan is a 360-degree scan, personal object model generation module 346 can generate a three-dimensional (3D) model of the personal object based on the 360 degree scan. In another example, when the scan includes a plurality of two-dimensional (2D) images and corresponding depth data, personal object model generation module 346 can generate a 3D model of the personal object based on the images and the corresponding depth data, and can extrapolate 3D data points for the model where image data and/or depth data is missing. In some implementations, when the scan includes only 2D images, personal object model generation module 346 can generate a 2D model of the personal object. In some implementations, however, it is contemplated that personal object model generation module 346 can generate a 3D model of the personal object by estimating depth data from the 2D image(s), such as by applying artificial intelligence (AI) 3D reconstruction techniques. In some implementations, the model of the personal object can include imperfections and/or damage to the personal object, as indicated from the data collected by personal object scanning module 344. Further details regarding generating a model of a personal object based, at least partially, on a scan are described herein with respect to block 404 of FIG. 4.

Characteristic identification module 348 can identify one or more characteristics of the personal object by performing object recognition on the model of the personal object generated by personal object model generation module 346. For example, characteristic identification module 348 can identify relevant features of the model of the personal object (e.g., lines, curves, textures, colors, etc.), and compare those features to the features of known personal objects having known characteristics. For example, characteristic identification module 348 can compare the features of the model (e.g., a model of a necklace) to features of known necklaces having known characteristics (e.g., gemstones, lengths, metals, weight, etc.), in order to not only identify the personal object as a necklace, but also to identify the components of the necklace. In some implementations, other sensor data collected during the scan of the personal object can be combined with the model to identify such components and/or characteristics, such as electromagnetic radiation data, wirelessly transmitted data, density data, etc. Further details regarding object recognition and characteristic identification are described herein with respect to FIG. 5. Further details regarding identifying characteristics of a personal object by performing object recognition on a model of the personal object are described herein with respect to block 406 of FIG. 4.

Value determination module 350 can determine a value of the personal object by applying a machine learning model to the one or more identified characteristics of the personal object. The machine learning model can be trained, for example, on A) other personal objects having known characteristics, and B) associated historical insurance claims/insured values for those other personal objects. For example, the machine learning model can compare the characteristics identified by characteristic identification module 348 to known characteristics of personal objects having associated insurance claims estimating their value. Based on similarity of one or more of such characteristics from one or more of such other personal objects, value determination module 350 can predict a value of the personal object. Further details regarding training and applying a machine learning model to estimate value are described herein with respect to FIGS. 6 and 7. Further details regarding determining a value of a personal object by applying a machine learning model to one or more identified characteristics of a personal object are described herein with respect to block 408 of FIG. 4.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
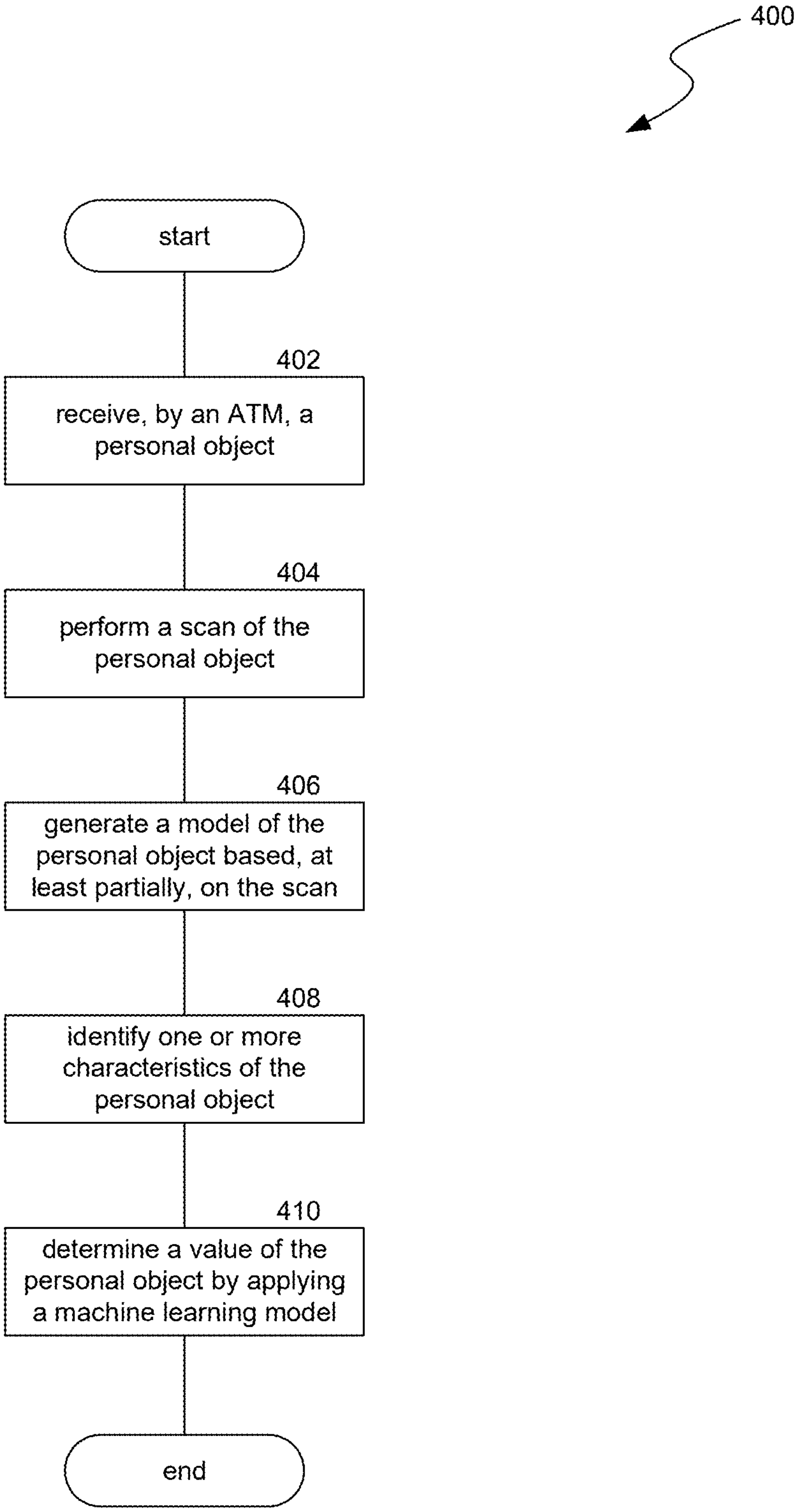
FIG. 4 is a flow diagram illustrating a process used in some implementations for performing object scanning and appraisal by an automated teller machine (ATM).

FIG. 4 is a flow diagram illustrating a process 400 used in some implementations for performing object scanning and appraisal by an automated teller machine (ATM). In some implementations, process 400 can be performed upon receipt of a personal object. In some implementations, process 400 can be performed by the ATM and its integral components, including one or more processing components. In some implementations, process 400 can be performed by object scanning and appraisal system 164 of FIG. 1. In some implementations, process 400 can be performed by ATM 502 of FIG. 5, ATM 800 of FIG. 8, and/or ATM 900 of FIG. 9.

At block 402, process 400 can receive, by the ATM, a personal object. Process 400 can receive the personal object via a receptacle of the ATM, such as a stage, a drawer, a slot, or other open or enclosable compartment of the ATM. The receptacle can be, for example, object receptacle 820 of FIG.

Figure 9:
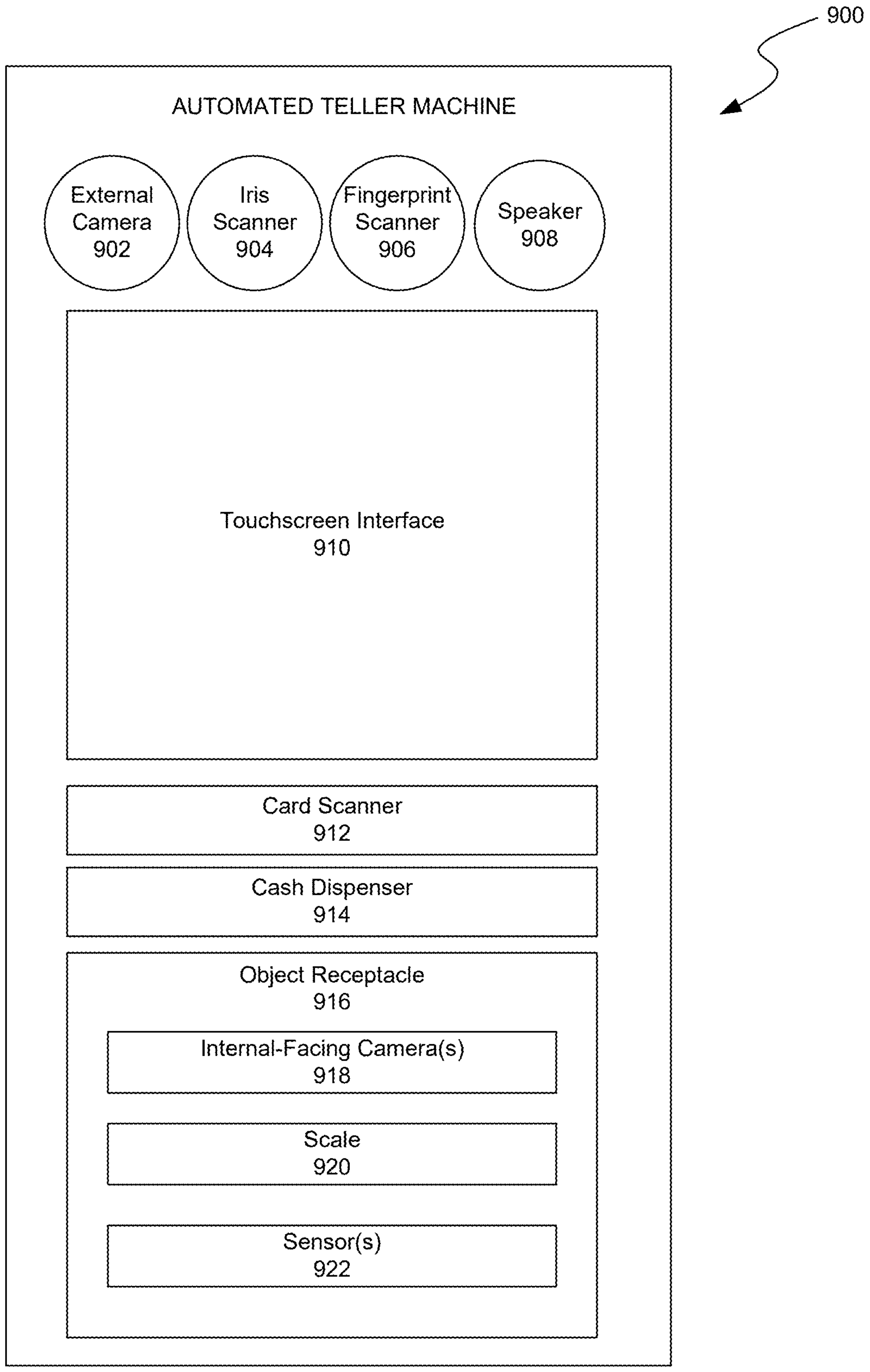
FIG. 9 is a block diagram illustrating components of an automated teller machine (ATM) according to some implementations.
Figure 10:
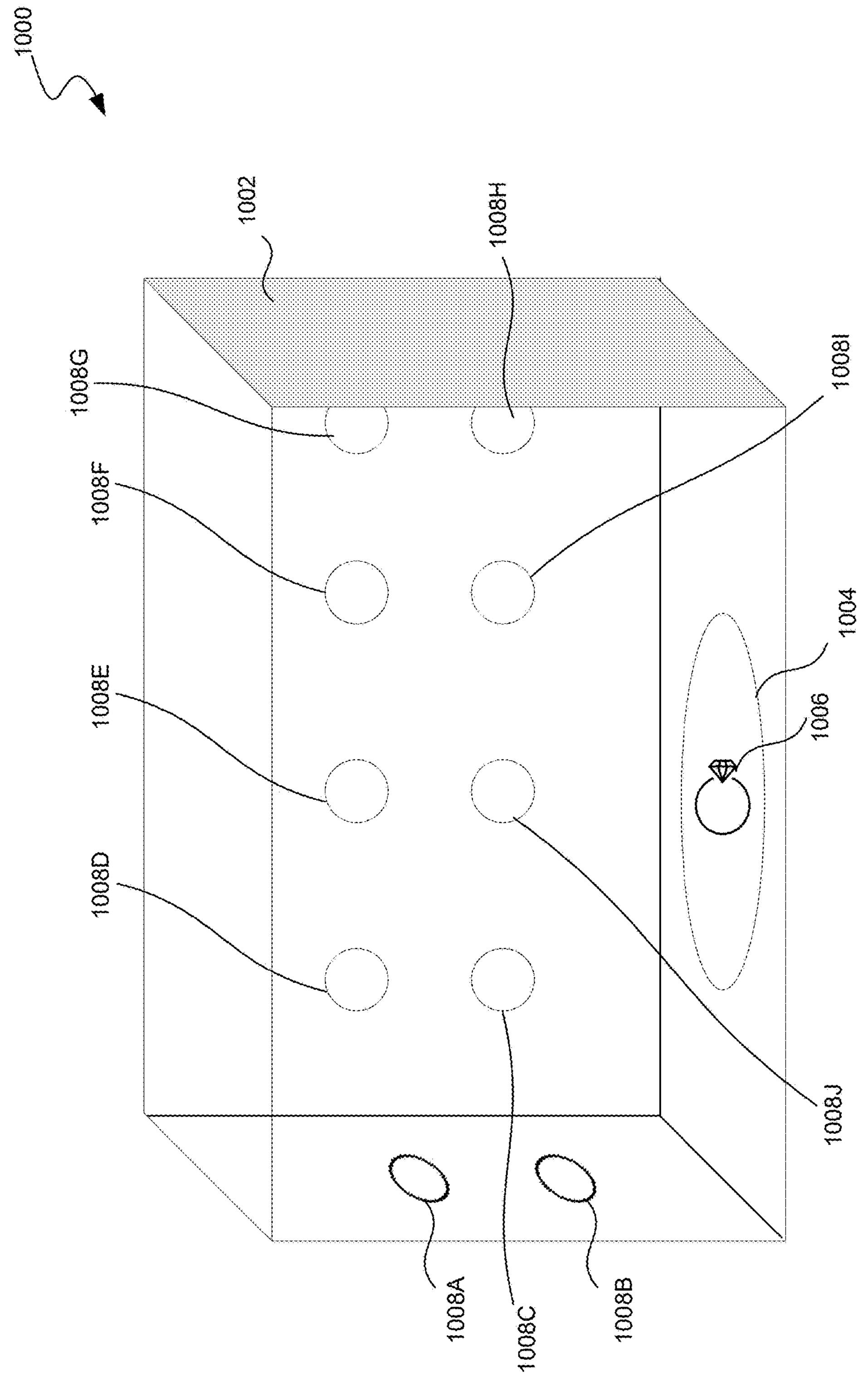
FIG. 10 is a conceptual diagram illustrating an exemplary personal object receptacle of an automated teller machine (ATM) according to some implementations.

8, object receptacle 916 of FIG. 9, and/or object receptacle 1002 of FIG. 10. The personal object can be any physical object configured and/or sized to fit within the receptacle of the ATM. In some implementations, the personal object can be a valuable and/or insurable personal object (e.g., a personal object having a value above a threshold, e.g., $100). For example, the personal object can include jewelry, electronics, antiques, wine, spirits, etc.

At block 404, process 400 can perform a scan of the personal object. In some implementations, the scan can be a 360-degree scan of the personal object, such as a scan made with a laser scanner. In some implementations, performing the scan can include capturing one or more images of the personal object using, e.g., one or more cameras or other images capture devices. In some implementations, performing the scan can include capturing depth data for the personal object, e.g., via one or more depth sensors. In some implementations, the one or more depth sensors can be collocated with the one or more cameras such that depth data for the personal object can be captured and correlated to particular portions of the captured images. In some implementations, process 400 can further determine a weight of the personal object, e.g., using a built-in scale, such as is built into a stage of the receptacle on which the personal object is placed. In some implementations, in performing the scan, process 400 can use other sensors to capture data regarding the personal object, such as ultrasound scanners, electromagnetic scanners, pressure scanners, refractometers, various types of alloy and other metal quality testers, spectrometers, etc. In some implementations, process 400 can scan and/or connect to and test one or more chips storing data regarding the personal object, such as a memory chip or processor. In some implementations, the scan can capture imperfections in and/or damage to the personal object, as described further herein.

At block 406, process 400 can generate a model of the personal object based, at least partially, on the scan. In some implementations, the model can be a three-dimensional (3D) model. In some implementations, process 400 can generate the 3D model based on the 360-degree scan of the personal object. In some implementations, process 400 can generate the 3D model based on one or more two-dimensional (2D) images of the personal object using captured depth data and/or by estimating depth data from the 2D images. In some implementations, process 400 can generate the 3D model based on two or more 2D images of the personal object that capture the personal object from different locations and/or angles.

At block 408, process 400 can identify one or more characteristics of the personal object. In some implementations, process 400 can identify the one or more characteristics of the personal object, at least partially, by performing object recognition on the model of the personal object. For example, process 400 can perform object recognition to determine a type of the object (e.g., a ring), then can identify the components of the recognized object from the model (e.g., gemstones, band, manufacturer/brand, etc.). An exemplary object recognition process is shown and described herein with respect to FIG. 5.

In some implementations, process 400 can identify one or more components of the personal object by applying artificial intelligence (AI) to the recognized object, such as to determine materials within the object. For example, for an object type of a ring, process 400 can determine metal types, gemstone types, etc. using AI techniques. In some implementations, using the 3D model of the personal object, process 400 can further predict sizes of the object's components (e.g., size of a diamond in an engagement ring). In some implementations in which a weight of the personal object is captured, the one or more identified characteristics of the personal object can include the weight of the personal object and/or the estimated weights of its components.

At block 410, process 400 can determine a value of the personal object. In some implementations, process 400 can determine the value of the personal object by applying a machine learning model to the one or more identified characteristics of the personal object. In some implementations, the machine learning model can be trained on A) other personal objects having known characteristics and B) associated historical insurance claims for such personal objects and/or their components. In some implementations, however, the machine learning model can be trained on other personal objects having known characteristics and their associated known values, such as based on a valuation guide, based on retail prices associated with personal objects and their components (with or without applying depreciation), etc. In some implementations, in determining the value of the personal object, process 400 can take into account any damage or imperfections in the personal object identified from the images or model of the personal object, such as by comparing the model of the personal object to an ideal model of the personal object obtained from a database. Further details regarding training and applying a machine learning process to determine value of a personal object are described herein with respect to FIGS. 6 and 7.

In some implementations, process 400 can perform one or more further operations after determining the value of the personal object. For example, in some implementations, process 400 can return the personal object to the user via the receptacle. In some implementations, however, process 400 can retain the personal object and dispense a payment instrument corresponding to the value of the personal object (e.g., dispensing cash or printing a check equal to the value of the personal object). In some implementations, process 400 can retain the personal object for storage in a safety deposit box. For example, in some implementations, the ATM can include an array of object receptacles having scanning and/or appraising capabilities that can also provide secure storage for scanned and/or appraised personal objects. In another example, the ATM can include a single object receptacle having scanning and/or appraising capabilities, but can have a separate associated array of safety deposit boxes that can be assigned to securely store scanned and/or appraised personal objects external to a teller-staffed branch.

In some implementations, process 400 can automatically generate an insurance policy for the personal object based on the value of the personal object. In some implementations, process 400 can further print the insurance policy for the personal object, such as via an existing integral receipt printer, or via an additional document printer included in the ATM. An exemplary ATM having document printing capabilities is further described in U.S. Pat. App. No. 63/587,293, filed Oct. 2, 2023, entitled "Automated Teller Machine Printing Services," which is herein incorporated by reference in its entirety. In some implementations, the insurance policy can include one or more of the captured images of the personal object.

In some implementations, process 400 can obtain a previous scan of the personal object. In some implementations, the previous scan can be made by the ATM, while in other implementations, the previous scan can be one or more images of the personal object previously captured by the user, a retailer selling the personal object, etc. Process 400 can compare the previous scan of the personal object to the current scan of the personal object to determine damage to the personal object. In some implementations, process 400 can generate an insurance claim for the personal object based on the determined damage to the personal object. The insurance claim can include at least one of repair or replacement cost for the personal object based on the damage, which, in some implementations, can also be predicted using a machine learning model In some implementations, process 400 can further dispense a payment instrument equal to the repair or replacement cost for the personal object.

Figure 5:
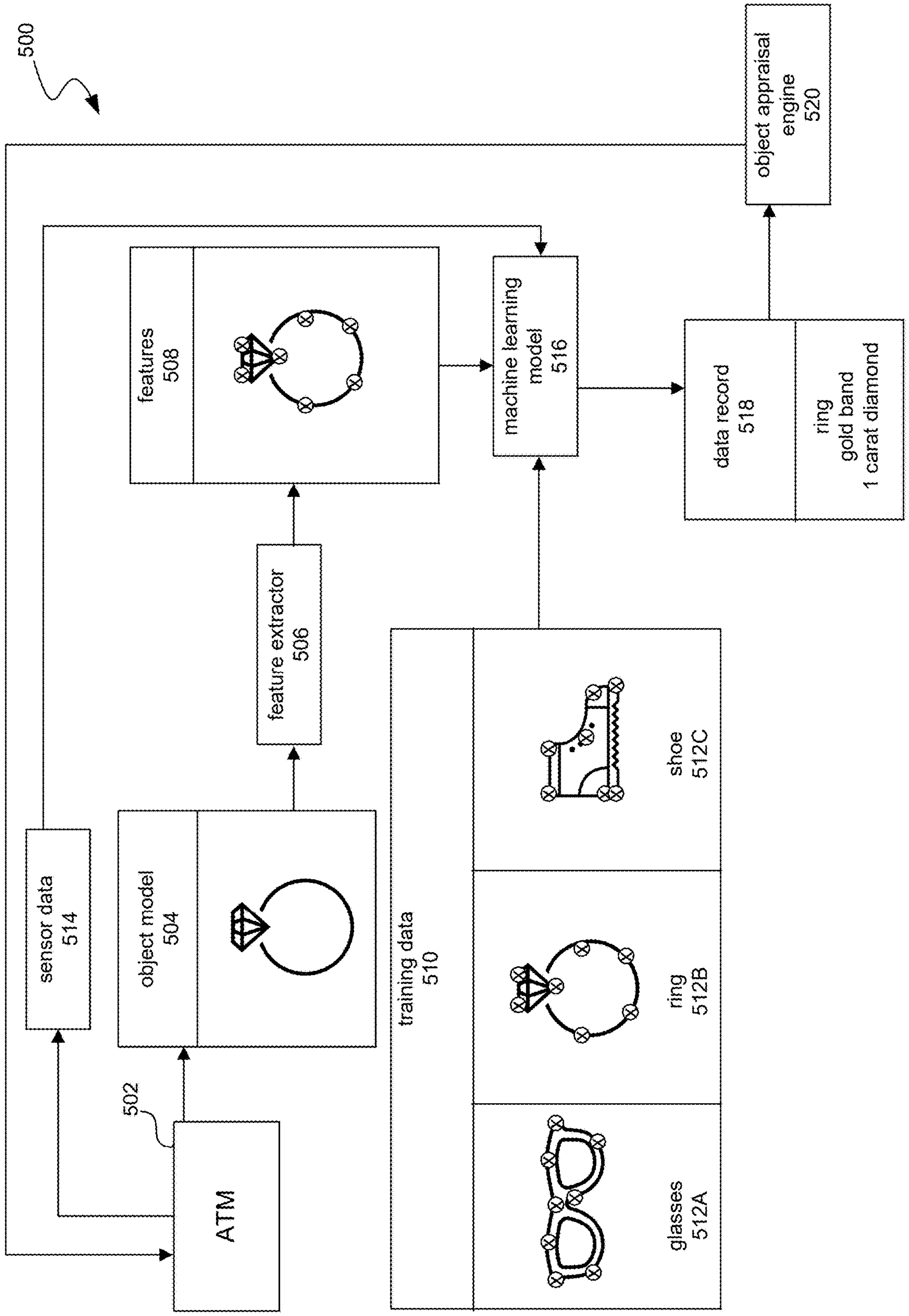
FIG. 5 is a conceptual diagram illustrating an exemplary flow for object recognition and characteristic identification according to some implementations of the present technology.

FIG. 5 is a conceptual diagram illustrating an exemplary flow 500 for object recognition and characteristic identification according to some implementations of the present technology. Automated teller machine (ATM) 502 can scan a personal object and generate object model 504 of the personal object; in this case, a model of an engagement ring scanned via ATM 502. In some implementations, ATM 502 can further capture sensor data 514 associated with the personal object, such as depth data, weight data, density data, etc.

Object model 504 can be fed into feature extractor 506 that can identify relevant features 508 in object model 504. The relevant features can correspond to, for example, edges, corners, shapes, curvatures, colors, or textures, or any combination thereof. Features 508 can be fed into machine learning model 516. Machine learning model 516 can obtain training data 510 including labeled personal objects with identified features; for example, glasses 512A, ring 512B, and shoe 512C. Machine learning model 516 can compare features 508 to training data 510 to determine a match score between features 508 and training data 510. In this case, machine learning model 516 can determine that the type of personal object from object model 504 is most similar to ring 512B. In some implementations, machine learning model 516 can determine that features 508 have the highest match score with ring 512B.

Machine learning model 516 can output data record 518 indicating that the personal object in object model 504 is a ring. In some implementations, machine learning model 516 (or a separate model) can further identify characteristics of the ring based on sensor data 514, based on training data of known characteristics associated with rings, etc. For example, data record 518 can include data indicating that the personal object in object model 504 is a ring with a gold band (e.g., as determined from the identified color of the band and/or by comparing the color of the ring to known gold bands) and 1 carat diamond with a determined diamond rating (e.g., as determined by estimating the size of the diamond from object model 504, comparing the model of the diamond to known diamonds of 1 carat size, performing refractive index measurements, etc.).

In some implementations, data record 518, or any derivative of, can be displayed in any suitable means on ATM 502, such as textually. In some implementations, a user of ATM 502 providing the personal object of which object model 504 was generated can confirm or modify the object and components identified in data record 518 via ATM 502, such as through a keyboard or touchscreen. In some implementations, this confirmation or modification can be provided as feedback to machine learning model 516 (not shown). Machine learning model 516 can then be updated based on the feedback.

Data record 518 (whether modified or not based on feedback as described above) can be provided to object appraisal engine 520, which, in some implementations, can be similar to value determination module 350 of FIG. 3. Object appraisal engine 520 can determine a value for the personal object based on data record 518. In some implementations, object appraisal engine 520 can estimate the value of the personal object based on valuation guidelines relative to the personal object and its components. In some implementations, object appraisal engine 520 can estimate the value of the personal object by applying a machine learning model to data record 518. The machine learning model can be trained, for example, on A) known personal objects and/or known components of personal objects, and B) known values of such personal objects and/or components, and/or C) historical insurance valuations and/or claims for such personal objects and/or components. Further details regarding applying a machine learning model to estimate the value of a personal object are shown and described herein with respect to FIGS. 6 and 7.

Figure 6:
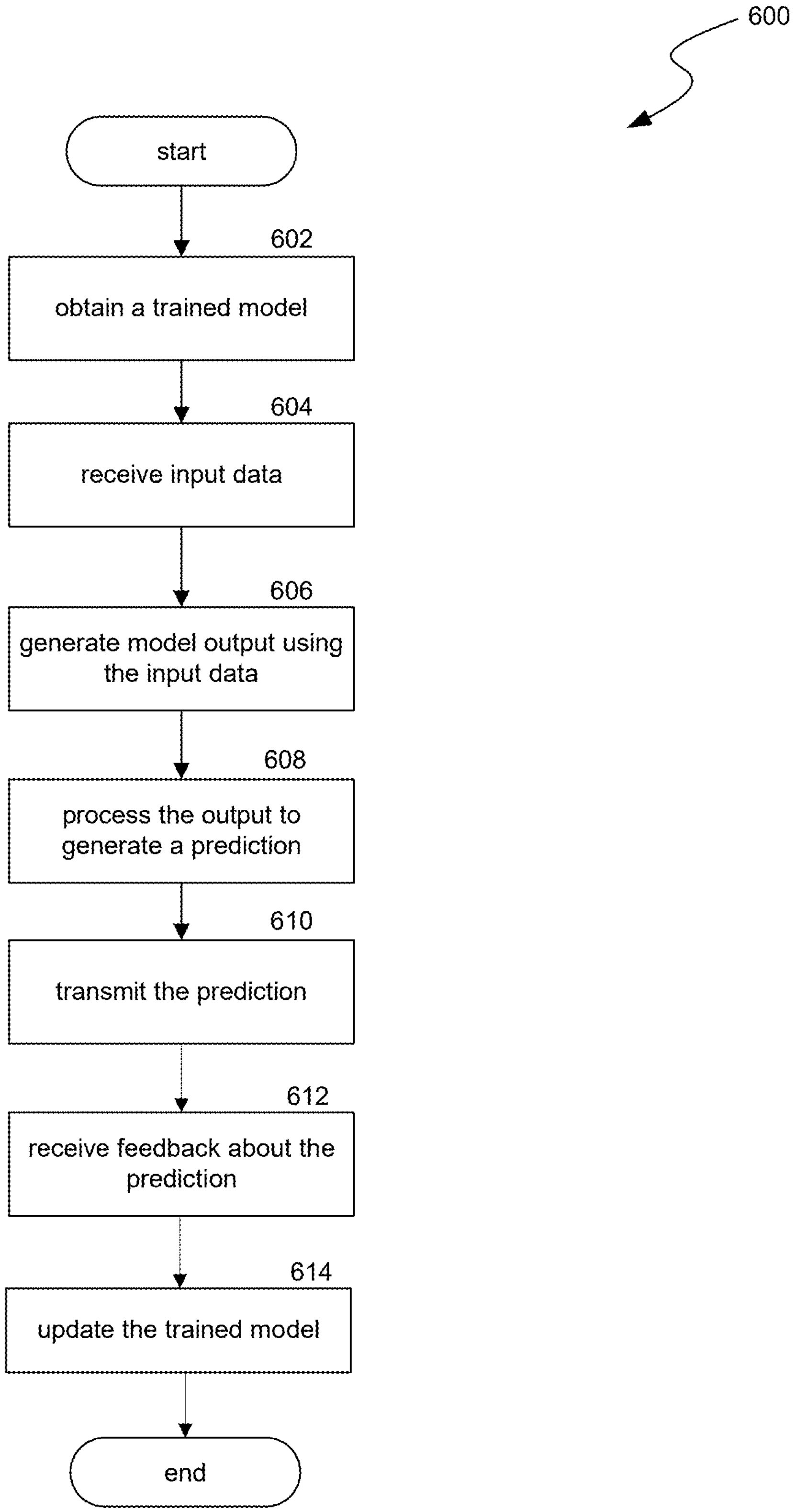
FIG. 6 is a flow diagram illustrating a process used in some implementations for applying and updating a trained model to perform object value estimation according to some implementations of the present technology.

FIG. 6 is a flow diagram illustrating a process 600 used in some implementations for applying and updating a trained model to perform personal object value estimation according to some implementations of the present technology. In some implementations, process 600 can be performed as a response to receipt of a machine learning model trained on historical insurance claims for known personal objects having known characteristics, and upon receipt of identified characteristics of a personal object from an automated teller machine (ATM). In some implementations, some or all of process 600 can be performed by the ATM. In some implementations, some or all of process 600 can be performed by a computing system remote from the ATM, such as a computing system associated with an insuring entity.

At block 602, process 600 can receive a trained model. In some implementations, the received model can be initially trained by a computing system of an insuring entity based on historical, actual claim amounts associated with personal objects having known characteristics and/or known damage. In some implementations, process 600 can receive an updated machine learning model, such as when process 600 is performed iteratively.

At block 604, process 600 can receive input data. In some implementations, the input data can include a labeled personal object type and/or identified characteristics of the personal object. In some implementations, process 600 can further receive and/or obtain contextual factors regarding the personal object and/or the ATM, such as a location of the ATM receiving the personal object, current inflation rates for the location, etc. In some implementations, process 600 can obtain contextual data from the user via the ATM, such as a price paid for the personal object, a location where the personal object was purchased, storage and/or environmental conditions surrounding the personal object, previous damage events relative to the personal object, etc.

At block 606, process 600 can generate a model output using the input data (e.g., the personal object type, characteristics of the personal object, etc.) and the trained model. In some implementations, process 600 can further generate the model output using any contextual factors. In some implementations, based on the input data, process 600 can extract relevant features from the input data and map the features as data points to an output vector in the classification space created using the training data.

At block 608, process 600 can process the model output to generate an estimated value of the personal object based, at least partially, on the characteristics of the personal object. In some implementations, process 600 can generate a match score between the output (i.e., the mapped features of the input data) and the features of candidate personal objects having known characteristics (and associated insurance claims) in the classification space by calculating a distance between the output and the candidate personal objects and/or candidate characteristics of personal objects. The match score can be any numerical or textual value or indicator, such as a statistic or percentage. Process 600 can identify the predicted value based on, for example, the candidate personal object and/or particular characteristics of the candidate personal object, with an associated historical insurance claim, having the highest match score to the output.

At block 610, process 600 can transmit the prediction and/or write the prediction to storage. In some implementations, process 600 can output the predicted value. In some implementations, process 600 can write the predicted value to a database maintained by an insuring entity. In some implementations, process 600 can output the predicted value by causing a graphical user interface (GUI) on a computing device of the user, a computing device of an insurance adjuster, a computing device of a repair facility, a computing device of a valuation entity, and/or the ATM to display the predicted value.

At block 612, process 600 can receive feedback about the predicted claim estimate. For example, process 600 can receive an actual reported value by the user via the ATM. In another example, process 600 can receive an actual value from an insurance adjuster and/or valuation entity (e.g., a jeweler, an antiques broker, etc.). Process 600 can receive the feedback by the same or a different computing system by which the predicted value was output or stored.

At block 614, process 600 can update the trained model. For example, process 600 can use the feedback data to identify whether the predicted value of the personal object was correct or incorrect (and if incorrect, what the correct value was), and use that information as a comparison factor to update the model and/or the classification space. In some implementations, process 600 can weigh the current training data more heavily than the initial or past training data, as the later training data can be considered more relevant and/or accurate. Although illustrated as a single process 600 in FIG. 6, it is contemplated that process 600 can be performed multiple times and/or repeatedly, either consecutively or concurrently, as additional input data is received.

Some implementations of the object scanning and appraisal system described herein can include a machine learning component, such as a neural network, that is trained using a variety of data, including known input data, contextual factors, and whether the predicted value was correct or incorrect. Some implementations can feed input data including identified characteristics of the personal object and any contextual factors into the trained machine learning component, and based on the output, can generate a predicted value of the personal object. Some implementations provide this predicted value to a user via a GUI on a display of an ATM, on a display of a computing system of an insurance adjuster, on a display of a computing system of an object valuation entity, etc. Some implementations receive feedback about the predicted value to further enhance the trained model.

A "machine learning model," as used herein, refers to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include: neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, the trained model can be a neural network with multiple input nodes that receive input data including characteristics of a personal object and any contextual factors. The input nodes can correspond to functions that receive the input and produce results. These results can be provided to one or more levels of intermediate nodes that each produce further results based on a combination of lower level node results. A weighting factor can be applied to the output of each node before the result is passed to the next layer node. At a final layer, ("the output layer,") one or more nodes can produce a value classifying the input that, once the model is trained, can be used to predict a value for a personal object. In some implementations, such neural networks, known as deep neural networks, can have multiple layers of intermediate nodes with different configurations, can be a combination of models that receive different parts of the input and/or input from other parts of the deep neural network, or are convolutions or recurrent-partially using output from previous iterations of applying the model as further input to produce results for the current input.

A machine learning model can be trained with supervised learning, where the training data includes known input data and any contextual factors and a desired output, such as a predicted value of a personal object. Current input data (e.g., characteristics of a personal object) can be provided to the model. Output from the model can be compared to the desired output for that input data, and, based on the comparison, the model can be modified, such as by changing weights between nodes of the neural network or parameters of the functions used at each node in the neural network (e.g., applying a loss function). After applying each of the factors in the training data and modifying the model in this manner, the model can be trained to evaluate new input data.

Some implementations of the object scanning and appraisal system can include a deep learning component. A "deep learning model," as used herein, refers to a construct trained to learn by example to perform classification directly from input data. The deep learning model is trained by using a large set of labeled data and applying a neural network as described above that includes many layers. The deep learning model in some implementations can be a convolutional neural network (CNN) that is used to automatically learn input data's inherent features to identify a predicted value of a personal object. For example, the deep learning model can be an R-CNN, Fast R-CNN, or Faster-RCNN.

Figure 7:
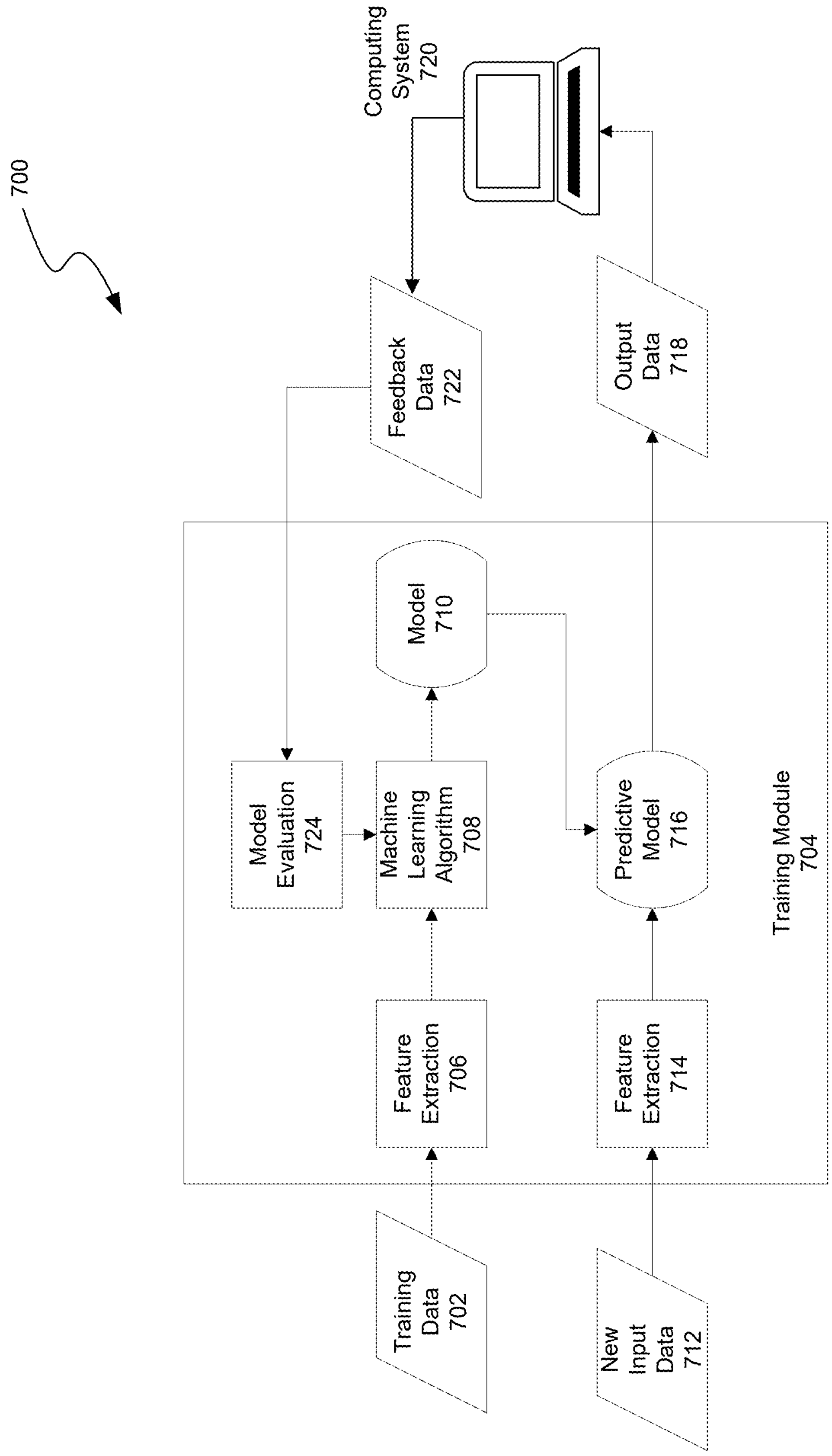
FIG. 7 is a block diagram illustrating an overview of a machine learning system that can be applied to perform object value estimation according to some implementations of the present technology.

FIG. 7 is a block diagram illustrating an overview of a machine learning system 700 that can be applied to perform value estimation of a personal object according to some implementations of the present technology. In a training phase, system 700 can feed raw training data 702 (e.g., historical claims for personal objects) into feature extraction 706 of training module 704 to select useful features (e.g., particular characteristics of personal objects) from all available features. As described further herein with respect to FIG. 6, the contextual factors can include any additional data surrounding personal objects, such as type of personal object, location of personal object, type of damage to the personal object, severity of damage to the personal object, etc., and can be obtained using any suitable method.

System 700 can feed the extracted features to machine learning algorithm 708. Machine learning algorithm 708 can identify a model 710 that maps the characteristics of personal objects and any contextual factors to predicted values, and uses past feedback to identify whether the predictions were correct. In some implementations, model 710 can be a neural network. System 700 can repeat the training phase until a suitable accuracy level is reached, e.g., as identified by applying a loss function, such as when a sufficient amount of training data 702 has been processed and predictions made by model 710 do not deviate too far from actual results. As appreciated by one skilled in the art, if model 710 is a deep learning model, a large amount of training data may be needed to make accurate predictions.

In a predicting phase, system 700 can feed new input data 712 into feature extraction 714 of training module 704 to select useful features. System 700 can apply a predictive model 716 to the extracted features based on the trained model 710 to generate output data 718 (e.g., a predicted value). System 700 can output or write data 718 to computing system 720, which can be a computing system of an insuring entity underwriting an insurance policy or handling a claim, a computing system of a user in possession of the personal object, an automated teller machine (ATM) scanning the personal object, and/or a computing system of a repair or replacement facility. In some implementations, the user of computing system 720 (or a user on a different computing system) can provide feedback data 722 to training module 704 via computing device 720, such as feedback regarding whether the predicted value was correct or incorrect, and if incorrect, what the correct value was.

System 700 can input the feedback data 722 into model evaluation 724 to restart the training phase. Model evaluation 724 can evaluate predictive model 716 with metrics, for example. The metrics can include accuracy, precision, F1 score, Mean Squared Error, etc. System 700 can feed these metrics back into machine learning algorithm 708 to refine and update model 710, if necessary, and the predicting phase can be repeated.

Although described herein primarily as relating to value estimation, it is contemplated that the machine learning models described herein with respect to FIGS. 6 and 7 can be similarly used to make other predictions. For example, the machine learning models described herein can be used to perform object recognition based on a model of a personal object, such as is described with respect to machine learning model 516 of FIG. 5. In still another example, the machine learning models described herein can be used to identify the characteristics of a personal object based on a recognized object type (e.g., types of materials used in a personal object based on materials used in similar personal objects).

Figure 8:
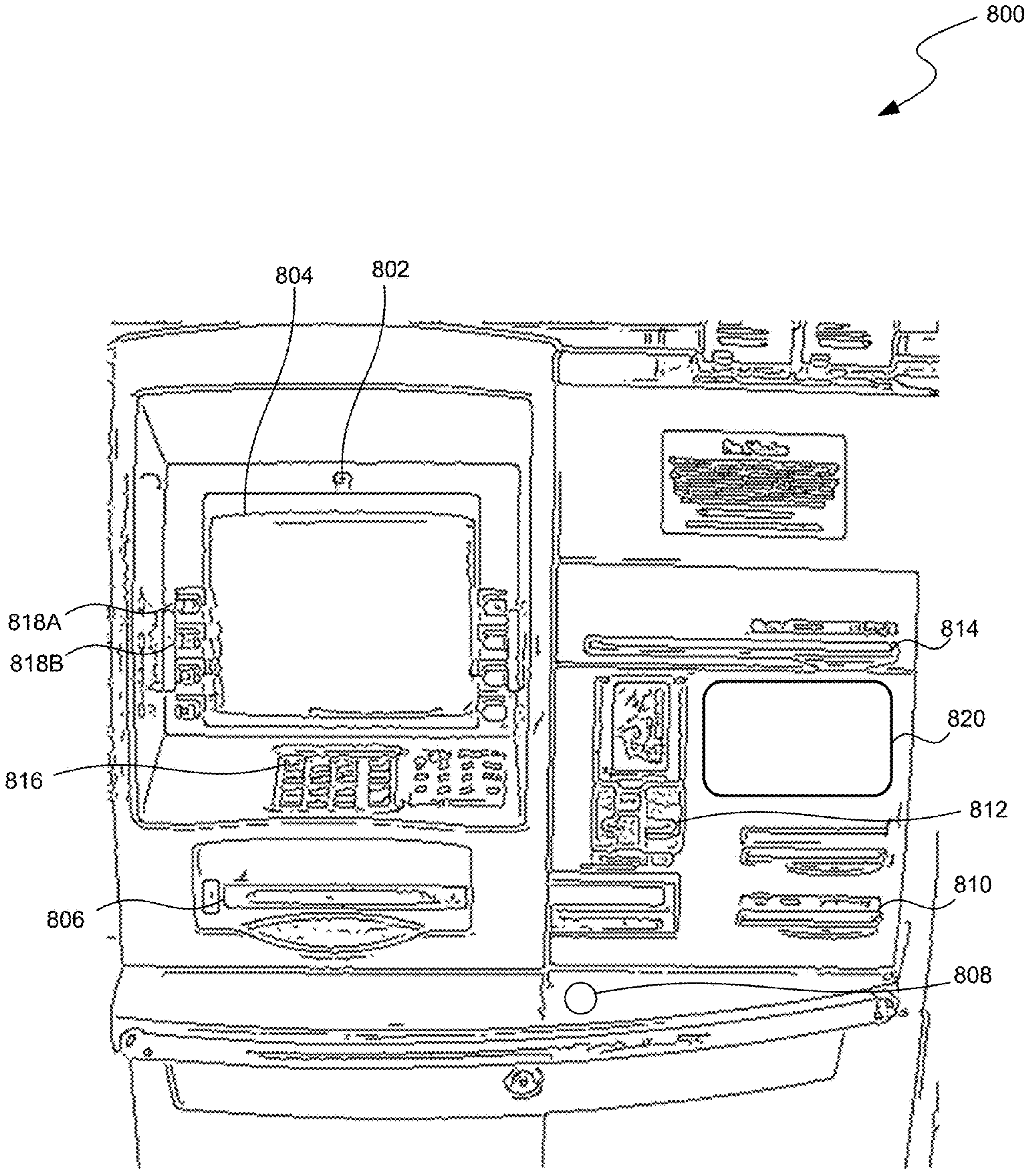
FIG. 8 is a conceptual diagram illustrating an exemplary automated teller machine (ATM) according to some implementations.

FIG. 8 is a conceptual diagram illustrating an exemplary automated teller machine (ATM) 800 according to some implementations. As one example, ATM 800 can be an exemplary physical structure embodying the components of ATM 900 of FIG. 9, described further herein. In some implementations, ATM 800 can execute any one or more of the functions of the ATM described throughout. Although illustrated as including particular components, it is contemplated that ATM 800 can include any combination of components for executing one or more the functions described herein, such as fewer components, or additional components included in conventional ATMs, as appreciated by one skilled in the art.

ATM 800 can include display 804. Display 804 can be any suitable display, such as a light emitting diode (LED) display, a liquid crystal display (LCD), a cathode ray tube (CRT) display, etc. In some implementations, display 804 can be a touchscreen display. In some implementations, however, display 804 need not be a touchscreen display, and ATM 800 can instead have input mechanisms 816, 818A-818B to facilitate usage of ATM 800. For example, input mechanism 816 can be a numerical pad, while input mechanisms 818A-818B can be buttons provided to select options displayed on display 804. In some implementations, such input mechanisms 816, 818A-818B can be provided in conjunction with a touchscreen display 804. In some implementations, display 804 can perform the same functions described herein with respect to touchscreen interface 910 of FIG. 9.

In some implementations, ATM 800 can further include camera 802, which can perform both surveillance for security of ATM 800 and its users, as well as image capture of users of ATM 800 for authentication purposes. For example, in some implementations, camera 802 can capture an image of a user at ATM 800, and ATM 800 can perform facial recognition techniques to authenticate the user for access to ATM 800 and its various functions. In some implementations, camera 802 can perform the functions described herein with respect to camera 902 and/or iris scanner 904 of FIG. 9. In some implementations, however, ATM 800 can employ a separate iris scanner (not shown) for authenticating the identity of a user, similar to that described with respect to iris scanner 904 of FIG. 9. In some implementations, ATM 800 can include fingerprint scanner 808 to authenticate the identity of a user, as described further herein with respect to fingerprint scanner 906 of FIG. 9.

In some implementations, ATM 800 can authenticate the identity of a user using the user's bank or credit card and a personal identification number (PIN). For example, the user can enter a card into card scanner 812 (which, in some implementations, can be similar to card scanner 912 of FIG. 9). Card scanner 812 can read the card, and display 804 can prompt the user to enter the associated PIN number via input mechanism 816. Upon confirmation that the correct PIN number was entered, the user can be authenticated. ATM 800 can then provide the user with access to any of its functions described herein, such as opening receptacle 820, scanning and/or appraising a personal object placed in receptacle 820, printing an insurance policy and/or insurance claim for a personal object scanned by receptacle 820 via document printer 814 (which, in some implementations, can be a composite printer also printing receipts for financial transactions performed by ATM 800), viewing the insurance policy and/or insurance claim via display 804, transmitting the insurance policy and/or insurance claim to an external computing system (e.g., a computing system of a user, a computing system of an insuring entity), etc. ATM 800 can further provide the user with access to financial transactions, such as withdrawing cash via cash dispenser 806 (which can be similar to cash dispenser 914 of FIG. 9), depositing checks and/or cash via deposit handler 810, etc.

FIG. 9 is a block diagram illustrating components of an automated teller machine (ATM) 900 according to some implementations, which can execute any of the functions described herein. ATM 900 can include external-facing camera 902, iris scanner 904, fingerprint scanner 906, speaker 908, touchscreen interface 910, card scanner 912, cash dispenser 914, and object receptacle 916. Although illustrated as including particular components 902-922, it is contemplated that, in some implementations, one or more of components 902-922 can be omitted, and/or one or more conventional ATM components can be added to those illustrated, as appreciated by one skilled in the art.

External-facing camera 902 can capture a video or still image of a user of ATM 900. For example, camera 902 can capture a face of the user while using ATM 900. In some implementations, ATM 900 can extract facial features from the image(s) captured by camera 902 (e.g., corners of eye, eye centers, nose curvature, width of mouth, cheekbones, shape of jawline, etc.) and compare them to previously captured facial images and/or previously identified facial features of the user (e.g., from a government-issued identification card of the user, from previously captured images of the user at ATM 900 or at a banking branch, etc.). In some implementations, ATM 900 can authenticate the user if the image(s) captured by camera 902 match such known historical image(s) of the user, which can be confirmed by performing such facial recognition techniques. Authentication of the user via camera 902 can allow the user to access the functions described herein of ATM 900.

Iris scanner 904 can scan the iris of the user of ATM 900 (e.g., when an iris image is used as biometric data to authenticate the user). In some implementations, external-facing camera 902 can alternatively or additionally capture the image of the iris of the user. Iris scanner 904 can capture the unique patterns in the iris of the user with invisible infrared light to pick up detailed patterns that may not be visible to the naked eye. In some implementations, ATM 900 can compare the captured iris patterns to previously captured, known iris patterns of the user, in order to authenticate the user, in order for the user to access the functions of ATM 900.

Fingerprint scanner 906 can scan one or more fingerprints of the user of ATM 900 (e.g., when one or more fingerprint images are used as biometric data to authenticate the user). Fingerprint scanner 906 can use any suitable fingerprint scanning technology. For example, in some implementations, fingerprint scanner 906 can be an optical scanner configured to shine light over the fingerprint and take a digital image of the fingerprint. The optical scanner can convert ridges and valleys of the fingerprint into a binary code representative of the fingerprint, which ATM 900 can compare to a previously captured, known binary code representative of the user's fingerprint, in order to authenticate the user. In some implementations, fingerprint scanner 906 can be a capacitive fingerprint scanner configured to measure conductivity of the finger and create a digital image based on its electrostatic field. ATM 900 can then compare the generated digital image to a previously captured, known digital image of the fingerprint to authenticate the user, in order for the user to access the functions of ATM 900.

Speaker 908 can output an audio signal in response to input by a user of ATM 900 and/or in response to a trigger event. For example, speaker 908 can output audible instructions while using ATM 900, such as for a user having a visual impairment. In such examples, it is contemplated that ATM 900 can further include a microphone (not shown) to receive audible commands by the user.

Touchscreen interface 910 can include a display screen configured to render a graphical user interface (GUI) for providing user access to the functions of ATM 900 described herein. In some implementations, touchscreen interface 910 can be a touch capacitive input interface. For example, touchscreen interface 910 can include a touch capacitive layer overlaid on a display layer (e.g., a light emitting diode (LED) or liquid crystal display (LCD) layer) to allow touchscreen interface 910 to receive input while displaying the GUI. Although described herein as being a touchscreen interface 910, however, it is contemplated that in some implementations, ATM 900 can include separate components for displaying the GUI and receiving input, such as through a mouse, a touchpad, one or more physical buttons, a keyboard, a number pad, etc., some of which are illustrated herein relative to FIG. 8.

Card scanner 912 can be configured to scan an inserted debit or credit card, when such a card is used to authenticate the user of ATM 900 (separately or in conjunction with an entered PIN number). In some implementations, card scanner 912 can scan the card via a magnetic reading head reading the magnetic stripe on the card. In some implementations, card scanner 912 can scan the card via an embedded EMV chip on the card, which can include an integrated circuit. Card scanner 912 can read the EMV chip via contact with the card or without contact with the card (e.g., using near field communication (NFC)). By authenticating the user via card scanner 912, ATM 900 can provide the user with access to its functions described herein.

Cash dispenser 914 can be configured to dispense cash in response to a withdrawal request made by the user via ATM 900. For example, the user can insert the card into card scanner 912, which can read an account number associated with the card. The user can then enter the card's associated PIN number via a number pad for authentication. Upon authentication, the user can request withdrawal of cash via touchscreen interface 910. ATM 900 can confirm availability of the requested funds, and cause cash dispenser 914 to output the cash. In some implementations, cash dispenser 914 can further accept deposits of cash and/or checks, as requested by the user via touchscreen interface 910.

Object receptacle 916 can be any compartment in which a user can place a personal object, as described further herein, for scanning and/or appraisal. In some examples, object receptacle 916 can be similar to object receptacle 820 of FIG. 8 and/or object receptacle 1002 of FIG. 10. Object receptacle 916 can include internal-facing camera(s) 918, scale 920, and sensor(s) 922 to perform one or more of the functions described herein. For example, internal-facing camera(s) 918 can include any image capture devices configured to capture one or a series of two-dimensional (2D) images of a personal object in object receptacle 916. In some implementations, internal-facing camera(s) 918 can include a 360 degree camera configured to capture the personal object from all angles, such that a three-dimensional (3D) model can be generated. In some implementations, one or more 2D images captured by internal-facing camera(s) 918 can be combined with depth data collected by a depth sensor of sensor(s) 922 in order to generate a 3D model of the personal object. In some implementations, sensor(s) 922 can include one or more other sensors, such as electromagnetic sensors, chip detection and/or chip reading sensors, wireless detection sensors, pressure sensors, materials sensors, etc. In some implementations, object receptacle 916 can further include scale 920, which can be configured to capture a weight of the personal object.

Although illustrated and described as separate components, it is contemplated that any of two or more of the functions described can be performed by one or more composite devices, and/or by separate devices sharing a common input and/or output in ATM 900. For example, it is contemplated that, in some implementations, the personal object can be a document that can be inserted into an input mechanism for cash dispenser 914, which can also perform other functions, such as printing a payment instrument corresponding to the appraised value of the document. Thus, a separate object receptacle 916 may not be needed, leaving ATM 900 compact in size, despite its additional functionality described herein.

FIG. 10 is a conceptual diagram illustrating a view 1000 of an exemplary object receptacle 1002 of an automated teller machine (ATM) according to some implementations. Object receptacle 1002 can perform any of the functions described herein to capture images and/or collect other data corresponding to a personal object 1006 placed within object receptacle 1002 of the ATM. For example, in some implementations, object receptacle 1002 can be an interior view 1000 of object receptacle 820 of FIG. 8, and/or can be a conceptual view 1000 of object receptacle 916 of FIG. 9.

In some implementations, object receptacle 1002 can include stage 1004 onto which personal object 1006 can be placed. In some implementations, stage 1004 can include one or more sensors or detectors, such as a weight scale, a materials detector, a density detector, etc., utilizing its physical contact with personal object 1006. In some implementations, stage 1004 can be positioned within object receptacle 1002 such that one or more of devices 1008A-1008J can effectively capture data corresponding to personal object 1006, such as image data, depth data, electromagnetic data, density data, materials data, etc.

In some implementations, two or more of devices 1008A-1008J can be similar devices, such as two or more cameras and/or depth sensors capturing data corresponding to personal object 1006 from different positions and/or angles, thereby capturing sufficient data to generate a three-dimensional (3D) model of personal object 1006. Although not illustrated, it is contemplated that, in some implementations, devices 1008A-1008J can be positioned on all sides of object receptacle 1002 (including, in some implementations, a movable door through which personal object 1006 is inserted), in order to capture data corresponding to personal object 1006 from a plurality of positions and angles. In some implementations, it is contemplated that one or more of devices 1008A-1008J can be movable within object receptacle 1002, such as to capture a 360-degree scan of personal object 1006. Although illustrated as including ten devices 1008A-1008J, it is contemplated that object receptacle 1002 can include any number of one or more devices in order to capture data corresponding to personal object 1006, as described further herein.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this s specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for performing object scanning and appraisal by an automated teller machine, the method comprising:

based on insertion of a debit or credit card into a card scanner of the automated teller machine, authenticating a user of the automated teller machine, wherein, upon the authenticating the user, the automated teller machine provides access to I) an object valuation function and II) one or more other functions relative to an account of the user, the account being associated with the debit or credit card, wherein the one or more other functions include one or more of: withdrawing cash from the account associated with the debit or credit card, transferring funds from the account to another account, depositing physical checks and/or cash into the account upon insertion into the automated teller machine, checking a balance of the account, or any combination thereof;

in response to the authenticating the user based on the insertion of the bank or credit card into the card scanner, opening an object receptacle of the automated teller machine;

receiving, by the automated teller machine via the object receptacle, a personal object;

performing a scan, by an object scanner of the automated teller machine, of the personal object;

generating a model of the personal object based, at least partially, on the scan;

identifying one or more characteristics of the personal object by performing object recognition on the model of the personal object;

determining a value of the personal object by applying a machine learning model to the one or more identified characteristics of the personal object, the machine learning model being trained on A) other personal objects having known characteristics and B) associated historical insurance data; and upon the determining the value of the personal object, performing one or more of:

i) returning the personal object to the user via the object receptacle;

ii) retaining, by the automated teller machine, the personal object, wherein, upon retaining the personal object, the automated teller machine:

dispenses a payment instrument corresponding to the determined value of the personal object, and/or securely stores the personal object in a safety deposit box, iii) generating an insurance policy for the personal object based on the value of the personal object;

iv) generating an insurance claim, for damage to the personal object identified by the scan, based on a difference between the determined value and a previously estimated value of the personal object; or v) any combination thereof.

2. The method of claim 1, wherein the model is a three-dimensional model.

3. The method of claim 1, wherein the scan is a 360 degree scan of the personal object.

4. The method of claim 1, wherein performing the scan includes capturing one or more images of the personal object.

5. The method of claim 1, wherein performing the scan includes capturing depth data for the personal object.

6. The method of claim 1, further comprising:

determining a weight of the personal object, wherein the one or more identified characteristics of the personal object includes the weight of the personal object.

7. The method of claim 1, wherein the automated teller machine dispenses the payment instrument corresponding to the value of the personal object.

8. The method of claim 1, further comprising:

determining damage to the personal object by comparing the scan of the personal object to a previous scan of the personal object; and determining the value of the personal object based on the determined damage, wherein the automated teller machine generates the insurance claim for the determined damage to the personal object identified by the scan based on the difference between the determined value and the previously estimated value of the personal object;

wherein the insurance claim includes at least one of repair or replacement cost for the personal object based on the determined damage to the personal object.

9. The method of claim 1, wherein the automated teller machine automatically generates the insurance policy for the personal object based on the value of the personal object.

10. A computer-readable storage medium storing instructions for performing object scanning and appraisal upon receipt of a personal object by an automated teller machine, the instructions, when executed by a computing system, cause the computing system to:

based on insertion of a debit or credit card into a card scanner of the automated teller machine, authenticate a user of the automated teller machine, wherein, upon the authenticating the user, the automated teller machine provides access to I) an object valuation function and II) one or more other functions relative to an account of the user, the account being associated with the debit or credit card, wherein the one or more other functions include one or more of: withdrawing cash from the account associated with the debit or credit card, transferring funds from the account to another account, depositing physical checks and/or cash into the account upon insertion into the automated teller machine, checking a balance of the account, or any combination thereof;

in response to the authenticating the user based on the insertion of the bank or credit card into the card scanner, open an object receptacle of the automated teller machine;

perform a scan, by an object scanner of the automated teller machine, of the personal object received via the opened object receptable;

generate a model of the personal object based, at least partially, on the scan;

identify one or more characteristics of the personal object by performing object recognition on the model of the personal object;

determine a value of the personal object by applying a machine learning model to the one or more identified characteristics of the personal object, the machine learning model being trained on A) other personal objects having known characteristics and B) associated historical insurance data; and upon the determining the value of the personal object, perform one or more of:

i) returning the personal object to the user via the object receptacle;

ii) retaining, by the automated teller machine, the personal object, wherein, upon retaining the personal object, the automated teller machine:

dispenses a payment instrument corresponding to the determined value of the personal object, and/or securely stores the personal object in a safety deposit box, iii) generating an insurance policy for the personal object based on the value of the personal object;

iv) generating an insurance claim, for damage to the personal object identified by the scan, based on a difference between the determined value and a previously estimated value of the personal object; or v) any combination thereof.

11. The computer-readable storage medium of claim 10, wherein the model is a three-dimensional model.

12. The computer-readable storage medium of claim 10, wherein the scan is a 360 degree scan of the personal object.

13. The computer-readable storage medium of claim 10, wherein performing the scan includes capturing one or more images of the personal object.

14. The computer-readable storage medium of claim 10, wherein performing the scan includes capturing depth data for the personal object.

15. An automated teller machine for performing object scanning and appraisal, the automated teller machine comprising:

a receptacle configured to receive a personal object;

an object scanner;

a card scanner;

one or more processors; and one or more memories storing instructions that, when executed by the one or more processors, cause a computing system, of the automated teller machine, to:

based on insertion of a debit or credit card into the card scanner of the automated teller machine, authenticate a user of the automated teller machine, wherein, upon the authenticating the user, the automated teller machine provides access to I) an object valuation function and II) one or more other functions relative to an account of the user, the account being associated with the debit or credit card, wherein the one or more other functions include one or more of: withdrawing cash from the account associated with the debit or credit card, transferring funds from the account to another account, depositing physical checks and/or cash into the account upon insertion into the automated teller machine, checking a balance of the account, or any combination thereof;

in response to the authenticating the user based on the insertion of the bank or credit card into the card scanner, open the object receptacle of the automated teller machine;

perform a scan, via the object scanner, of the personal object inserted into the opened object receptacle;

generate a model of the personal object based, at least partially, on the scan;

identify one or more characteristics of the personal object by performing object recognition on the model of the personal object;

determine a value of the personal object by applying a machine learning model to the one or more identified characteristics of the personal object, the machine learning model being trained on A) other personal objects having known characteristics and B) associated historical insurance data; and upon the determining the value of the personal object, performing one or more of:

i) returning the personal object to the user via the object receptacle;

ii) retaining, by the automated teller machine, the personal object, wherein, upon retaining the personal object, the automated teller machine:

dispenses a payment instrument corresponding to the determined value of the personal object, and/or securely stores the personal object in a safety deposit box, iii) generating an insurance policy for the personal object based on the value of the personal object;

iv) generating an insurance claim, for damage to the personal object identified by the scan, based on a difference between the determined value and a previously estimated value of the personal object; or v) any combination thereof.

16. The automated teller machine of claim 15, further comprising:

a scale, wherein the instructions, when executed by the one or more processors, further cause the computing system to:

determine, via the scale, a weight of the personal object, and wherein the one or more identified characteristics of the personal object includes the weight of the personal object.

17. The automated teller machine of claim 15, further comprising:

a dispenser configured to dispense the payment instrument corresponding to the value of the personal object.

18. The automated teller machine of claim 15, wherein the instructions, when executed by the one or more processors, further cause the computing system to:

determine damage to the personal object by comparing the scan of the personal object to a previous scan of the personal object; and determine the value of the personal object based on the determined damage, wherein the automated teller machine generate an insurance claim for the personal object based on the difference between the determined value and the previously estimated value of the personal object;

wherein the insurance claim includes at least one of repair or replacement cost for the personal object based on the determined damage to the personal object.

19. The automated teller machine of claim 15, wherein the automated teller machine automatically generates the insurance policy for the personal object based on the value of the personal object.

20. The automated teller machine of claim 15, wherein the object scanner includes at least one of one or more cameras, one or more depth sensors, or any combination thereof.

* * * * *